Patented Dec. 17, 1929

1,739,717

UNITED STATES PATENT OFFICE

JOHN A. GANN, OF MIDLAND, MICHIGAN, ASSIGNOR TO THE DOW CHEMICAL COMPANY, OF MIDLAND, MICHIGAN, A CORPORATION OF MICHIGAN

METHOD OF TREATING SHAVINGS AND SCRAP OF LIGHT METAL AND ALLOYS THEREOF

No Drawing.   Application filed November 8, 1926. Serial No. 147,195.

In the remelting of magnesium and alloys thereof, particularly when in the form of chippings, shavings or turnings and scrap generally, more or less difficulty is experienced in securing a satisfactory recovery of the metal due to the tendency of the latter to form small globules that become entrapped in the sludge. The amount of metal that goes into such sludge and is lost or necessitates a special recovery process in order to regain it depends somewhat on the purity of the shavings or scrap metal being melted as well as on the cleanliness of the flux employed in the melting operation, that is, in the freedom of such flux from sludge. It has been further discovered that the amount of metal thus going into the sludge likewise depends on the temperature at which the melting operation is conducted. In other words, the higher the temperature, the greater the tendency for the magnesium or alloy thereof to form small globules of metal that float in the flux, and if these, surrounded as they are by flux, come in contact with any appreciable quantity of dirt (magnesium oxide, iron filings, carbon from partially burned oil on the shavings, etc.), these dirt particles often adhere to the globules and increase their gravity to such a point that they sink to the bottom of the pot and become entrapped in the sludge there present.

An effort to make these globules of molten metal coalesce by agitation results in a further dispersion which increases with increasing agitation, due probably to the high surface tension of the metal and the low surface tension of the flux at these higher temperatures. On the other hand, I have found that if the melting is carried on at such a low temperature that the mass of metal is only semi-molten and actually contains crystals of the metal, agitation will cause such crystals to break through the enveloping film of flux and allow adjacent globules to come together and coalesce.

The object of the present invention, accordingly, is the provision of an improved method for treating shavings and scrap of light metal and alloys thereof wherein the foregoing discovery is utilized in order to bring together or consolidate the metal in a sizable mass or masses substantially free from sludge and with a minimum amount of metal left entrapped in the latter.

To the accomplishment of the foregoing and related ends, the invention, then, consists of the steps hereinafter fully described and particularly pointed out in the claims, the following description setting forth but one of the various ways in which the principle of the invention may be utilized.

The scrap metal in any of the forms referred to above is placed in a melting pot of the sort regularly employed in melting light metals, along with a suitable fluxing material. Several different fluxes have been described and used either in connection with the electrolytic production of magnesium or as a coating for the metal in molten state in order to protect the same against oxidation which becomes excessive when the molten metal is exposed directly to the atmosphere. Anhydrous magnesium chloride, which is a material employed in the electrolytic production of the metal, serves also when in molten condition as such a flux or protective coating but has too high a melting point, so that sodium chloride is ordinarily added to lower such melting point. A flux thus composed of magnesium chloride and sodium chloride will be found described in U. S. Patent No. 1,377,374 and also in German Patent No. 122,312, the latter describing a flux consisting of equimolecular weights of magnesium chloride, sodium chloride and potassium chloride, with the addition of a small amount of calcium fluoride.

It will be understood that the particular composition of the flux thus used is not a feature of the present invention, except that preferably the ingredients of such flux should be so proportioned as to raise the specific gravity thereof slightly above that of the metal, whether magnesium alone or an alloy thereof, with which it is to be used.

A quantity of the flux is preferably first placed in the pot and the latter then heated until such flux becomes fluid, this occurring, as indicated, at a temperature below the melting point of the metal being treated. There-upon a quantity of the scrap is added and, if necessary, the application of heat is continued until a temperature is reached where the metal begins to fuse; or if the temperature should happen to be carried beyond this point, additional scrap may be placed in the pot to bring it down again. The temperature, however, will be such that the flux, whatever its specific composition, will remain wholly fluid so as to form a protective film or envelope for the metal, and if of the proper specific gravity, the free metal will float or tend to float in the flux bath. The particular temperature thus employed will obviously vary somewhat with the composition of the metal, i. e. whether pure magnesium or one of the so-called light metal alloys in which magnesium is a predominant constituent. For example, in the case of such pure magnesium, the preferred temperature will lie from approximately 600 degrees C. to approximately 650 degrees C., while in the case of an alloy containing 92 per cent magnesium and 8 per cent aluminum, the temperature range will lie from approximately 400 degrees C. to approximately 500 degrees C.

The scrap metal can be fed into the pot in loose form, i. e. be simply shoveled in, or it may be first compacted into bundles or other more or less solid forms. Where introduced loose, the pieces will tend momentarily to float on the surface, which has the advantage that adherent oil is driven off without becoming mixed up with the bath at all.

When the metal in the pot has been brought to the indicated temperature, the mass is stirred or otherwise agitated and as a result the metal being in only semi-molten condition and still containing grains or crystals of the solidified metal, will be found readily to coalesce into larger aggregates and under ordinary conditions substantially all of the metal in the pot can be, as a matter of fact, brought together into a single mass. When this stage is reached, the temperature, if desired, may be raised somewhat so as to render such mass wholly molten or fluid throughout, preliminary to dipping or pouring it out of the pot for casting into ingots or other shapes.

By operating in the manner described, dirt particles that tend to carry down small globules of magnesium metal do not have this effect on the larger masses of metal produced by the coalescence of the smaller globules. Accordingly, any sludge that settles out during the preliminary agitation step will be substantially free both of occluded metal and of globules thus attached to heavier particles of foreign matter. However, after aggregation of the disseminated metal has been accomplished and the mass raised to a higher temperature, opportunity is then afforded for the sludge to settle out and such settling is accomplished without the sludge dragging along therewith any consequential amount of metal.

It will be understood that the scrap metal that is to be melted down may, if found desirable, be introduced in successive increments. In fact, this will be the natural procedure since a quantity of scrap sufficient to fill the pot in unmelted state will, after being thus melted down, occupy considerably less space. Furthermore, after the melting or refining operation has been completed as to a particular mass of scrap and the agglomerated metal raised to casting temperature, it is not necessary that all of such metal be dipped or poured from the pot but only so much as can be conveniently removed without entrapping flux or sludge; whereupon a further quantity of scrap may be charged into the pot, the temperature of the mass thus lowered and the operation repeated as before. Moreover, should the mass of metal by chance be raised to a temperature above that hereinbefore indicated as suitable for the purpose in hand, such mass may be allowed to cool until the metal begins to crystallize out, i. e. becomes mushy, and then upon proper agitation the particles may be caused to agglomerate.

The term "light metal" as used herein will be understood to designate either magnesium by itself or alloys of the character hereinbefore described wherein magnesium is the predominant constituent. Similarly, the term "scrap" will be understood as designating any form of such light metal, whether shavings, turnings, chippings, fragments of castings or the like, with which objectionable foreign matter is in any way intermixed or included.

Finally, while reference has been made above to melting the scrap with a flux admixture, the principle of the invention is also applicable to melting under a neutral atmosphere, as is sometimes practiced with magnesium and alloys thereof, in which case the use of a flux may not be imperative. Similarly, in a case where the molten metal is drawn off from beneath the surface, the flux employed may be light enough to float wholly on such surface.

Other modes of applying the principles of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of treating light metal, the steps which consists in adding the same to a bath of suitable flux and like metal, heating the mixture to a condition of partial fusion of the metal, agitating the mass until the metal coalesces, and subsequently raising the temperature to render the metal sufficiently fluid to permit substantially complete separation of the flux and sludge from the metal.

2. In a method of treating light metal scrap, the steps which consist in heating a mixture of such scrap and a suitable flux to a condition of partial fusion of the metal, and agitating to coalesce the partly fused metal particles, substantially as described.

3. In a method of treating light metal scrap, the steps which consist in adding the same to a molten body of flux of lower melting point than the metal, maintaining the mixture at a condition of partial fusion of the metal but at a temperature above the melting point of such flux, and agitating.

4. In a method of treating light metal scrap, the steps which consist in adding the same to a molten body of flux of lower melting point than the metal, maintaining the mixture at a condition of partial fusion of the metal but at a temperature above the melting point of such flux, agitating the mixture until the metal particles coalesce, and then raising the temperature to render the metal substantially entirely fluid.

5. In a method of treating light metal scrap, the steps which consist in adding the same to a molten body of flux of lower melting point than the metal, maintaining the mixture at a condition of partial fusion of the metal but at a temperature above the melting point of such flux, agitating the mixture until the metal particles coalesce, then raising the temperature to render the metal substantially entirely fluid, the mixture being allowed to stand quietly until the sludge settles out.

6. In a method of treating light metal scrap, the steps which consists in adding the same to a molten body of flux of lower melting point than the metal, maintaining the mixture at a condition of partial fusion of the metal but at a temperature above the melting point of such flux, agitating the mixture until the metal particles coalesce, and then raising the temperature to render the metal substantially entirely fluid, the mixture being allowed to stand quietly until the sludge settles out, whereupon the supernatant pure metal is removed for casting or other use.

7. In a method of treating light metal scrap, the steps which consist in adding a mass of the material to a flux of lower melting point but higher specific gravity than the metal, heating to a condition of partial fusion of the metal but at a temperature above the melting point of such flux, and agitating.

8. In a method of treating light metal scrap, the steps which consist in adding a mass of the material to a flux of lower melting point but higher specific gravity than the metal, heating to a condition of partial fusion of the metal but at a temperature above the melting point of such flux, agitating the mass until the metal particles coalesce, and finally raising the temperature to render the metal sufficiently fluid for casting.

9. In a method of treating light metal, the step of coalescing particles of the metal in a state of partial fusion by agitating with a mass of like metal and a suitable flux.

10. In a method of treating light metal, the step of coalescing particles of the metal in a state of partial fusion by agitating with a suitable flux.

Signed by me this 5th day of November, 1926.

JOHN A. GANN.